Jan. 6, 1959

E. E. HUPP 2,867,235

SNAP ACTING DUAL VALVE MECHANISM

Filed March 15, 1955

INVENTOR.
EDWARD E. HUPP
BY H. O. Clayton
ATTORNEY

Jan. 6, 1959   E. E. HUPP   2,867,235
SNAP ACTING DUAL VALVE MECHANISM
Filed March 15, 1955   2 Sheets-Sheet 2

INVENTOR.
EDWARD E. HUPP
BY *H.O.Clayton*
ATTORNEY

United States Patent Office 2,867,235
Patented Jan. 6, 1959

2,867,235

SNAP ACTING DUAL VALVE MECHANISM

Edward E. Hupp, South Bend, Ind., assignor to Bendix Aviation Corporation, South Bend, Ind., a corporation of Delaware Application March 15, 1955, Serial No. 494,435

1 Claim. (Cl. 137—622)

This invention relates generally to fluid pressure actuators for change speed mechanisms and more particularly to actuators including a fluid motor for selectively actuating the shifting mechanism of multi-speed drive axles of automotive vehicles.

My invention is particularly directed to a valve mechanism adapted to control the motor of the above identified actuator and to this end it is an object of my invention to provide a simple, compact, and easily serviced double three way valve for controlling a double acting fluid pressure motor.

Yet another object of my invention is to provide a double three way valve for controlling a fluid pressure motor the opening and closing operations of the valve being effected by spring means serving to quickly and positively actuate the movable part or parts of the valve.

A further object is to provide a manually and power operated over center spring operating mechanism for opening and closing a valve suitable for controlling a double acting fluid pressure operated motor.

Yet another object of my invention is to provide a snap action mechanism of relatively few parts for effecting a rocking movement of a lever such as a valve operating lever; and said mechanism is particularly characterized by the employment of a plurality of tension springs operative to move the lever when the springs are moved past their dead center position with respect to a certain fulcrum.

The above and other objects and features of the invention will appear more fully hereinafter from a consideration of the following description taken in connection with the accompanying drawings wherein one embodiment of the invention is illustrated by way of example.

Figure 1:
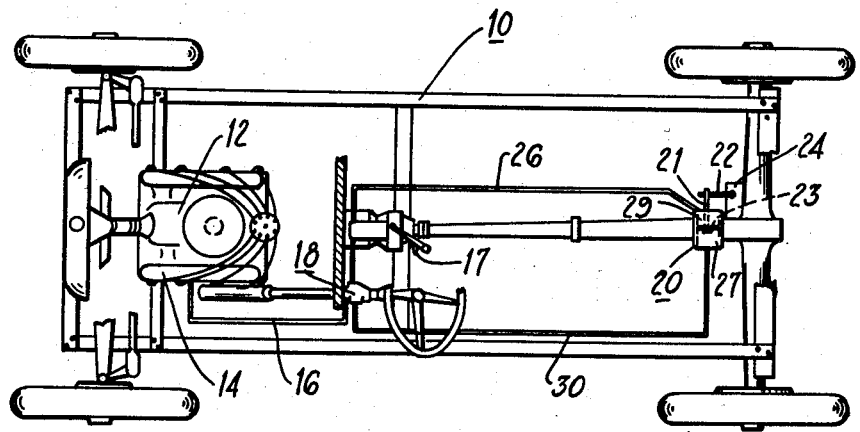
Figure 1 is a top plan view of the chassis of an automotive vehicle with parts removed for simplicity and showing a power plant embodying the valve mechanism constituting my invention.

Referring to the drawings disclosing a preferred embodiment of my invention I have shown at 10 generally the chassis of an automotive vehicle the internal combustion engine of the vehicle being indicated by the reference numeral 12. Communicating with the intake manifold 14 of the engine is a vacuum conduit 16 extending to a double three way valve mechanism 18 constituting my invention. This mechanism 18, which is hereinafter defined as a valve unit, serves to control the operation of a double acting pressure differential operated motor 20 the power element 23 of which is operably connected, by a rod 21, to a crank 22. This crank constitutes a part of a two speed axle mechanism 24 which mechanism, by the actuation of the crank, is established in either a high speed drive condition or a low speed drive condition.

The motor 20, no claim to which is made in this application, preferably consists of a double ended casing which houses the power element 23 said element serving, together with the casing, to provide two control compartments 27 and 29. The compartment 29 is connected, by a conduit 26, with a control compartment 28, Figure 2, of the valve unit 18; and the control compartment 27 of the motor is connected, by a conduit 30, with a control compartment 32 of the valve unit. When the motor 20 is energized its power element 23 moves in one direction or the other thereby effecting an angular movement of the crank 22 to operate the two speed axle. As will be described in greater detail hereinafter the energization of the motor 20 is effected by partially evacuating one or the other of the compartments 27 and 29 the remaining compartment being at the time vented to the atmosphere.

Figure 3:
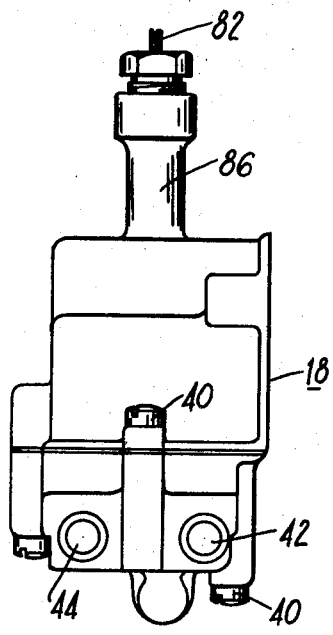
Figures 3 and 4 are side elevational views of the valve mechanism of my invention.
Figure 4:
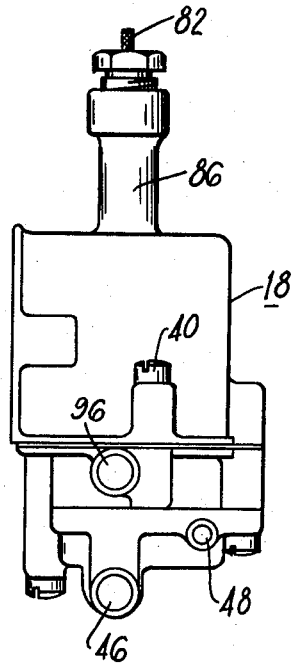

Describing now the details of my invention, that is the valve unit 18, this unit includes a three part casing 34 which may be mounted, by any suitable means on the transmission casing of the vehicle; and the valve may be actuated by a push pull knob 17. The three parts of the casing 34 are preferably secured together by means of screws 40 and the casing is ported at 42, Figure 3, to receive one end of the conduit 26, at 44 to receive one end of the conduit 30, at 46 to receive one end of the vacuum conduit 16, and at 48, Figure 4, to receive one end of a conduit 50, Figure 2, connected to a speedometer controlling fluid pressure motor, not shown. As is disclosed in Figure 2 the three part valve casing 34 is bored to provide the aforementioned compartments 28 and 32.

Figure 2:
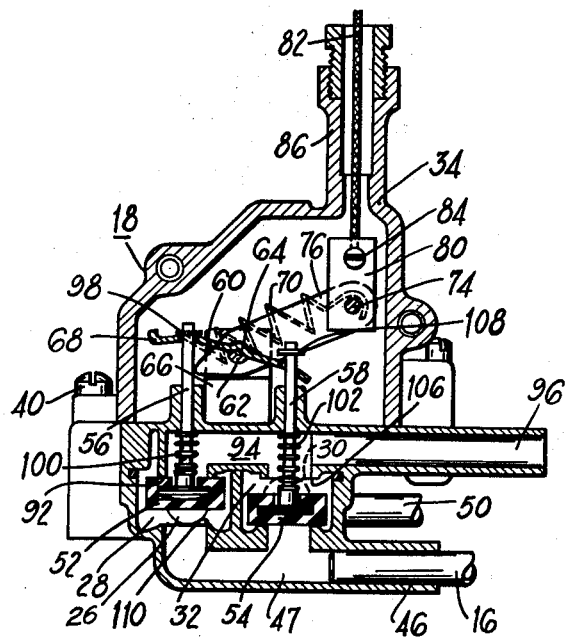
Figure 2 is a sectional view of the valve mechanism of my invention said view disclosing the mechanism in detail.
Figure 5:
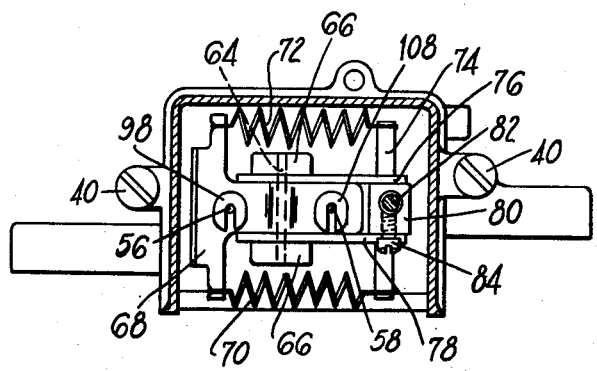
Figure 5 is another sectional view of the valve mechanism of my invention disclosing the lever operating springs of the mechanism.

Describing now the essence of the valve mechanism of my invention, valve members 52 and 54, housed within the compartments 28 and 32, respectively, are connected by pins 56 and 58, respectively, to a valve operating lever 60. Centrally located hub portions 62 of this lever, Figures 2 and 5, are journaled on a pin 64 mounted at its ends in the upper ends of spaced apart posts 66 secured at their bases to a portion of the valve casing; accordingly the lever 60, acting as a lever of the first class, is fulcrumed upon the pin 64. The lever 60 is provided at one end thereof with a cross arm 68, Figure 5, preferably integrally connected to the lever body; and to the ends of this arm are connected ends of preloaded tension springs 70 and 72. The other ends of the springs are connected to a pin 74, Figures 2 and 5, which extends through guide straps 76 and 78 which are pivotally mounted, at one of their ends, upon the pin 64. A block member 80 substantially centrally bored to receive a reciprocable flexible wire cable 82, is pivotally mounted on the pin 74 and is positioned between the straps 76 and 78.

The lower end of the cable 82 is adjustably secured to the block 80 by a set screw 84 and said cable extends through a boss portion 86 of the upper section of the three part casing. This cable, which serves to actuate the valve mechanism, is preferably terminated at its other end in an end member, i. e. the knob 17 fashioned to be grasped by the fingers of the hand of the driver.

Describing now the operation of the mechanism of my invention and incidentally completing the description of parts thereof not heretofore described, air operation of the knob 17 serves to rotate the straps 76 and 78 in a counterclockwise direction, Figure 2, and this operation also serves to move the tension springs 70 and 72 past their dead center position with respect to the fulcrum of the lever 60; and this operation serves, by a snap action, to effect a clockwise rotation of the lever 60 about the pin 64. The latter operation serves to very quickly move the pin 56 upwardly to the position disclosed in Figure 2 the valve member 52 in this operation being moved upwardly to a seat 92 to interconnect the compartment 28 with a vacuum compartment 47 and to cut off communication between said compartment and a compartment 94 vented to the atmosphere via a port 96 and an air cleaner, not shown. In this snap action operation of seating the valve member 52 by moving the pin 56 upwardly the cross arm portion 68 of the lever 60 contacts a C shaped stop member 98, Figure 5, secured to the top of the pin 56; and in this operation a valve return spring 100 is compressed.

Completing the description of this operation of the valve mechanism, that the operation resulting from lifting the knob 17 upwardly, it is to be noted from an inspection of Figure 2 that the clockwise rotation of the lever 60 serves to permit a spring 102 to expand to seat the valve member 54 upon a seat 104 thereby venting the compartment 32 to the atmosphere and cutting off its communication with the source of vacuum, that is the intake manifold. It follows therefore that this operation of the control valve 18 serves to connect the compartment 29 of the vacuum motor 20 to the source of vacuum and at the same time vent the compartment 27 of said motor to the atmosphere; and this operation results in an energization of said motor to effect say the low gear setting of the two speed axle mechanism 24. It is to be remembered that in order to make use of the intake manifold as a source of vacuum it is necessary for the driver to release the accelerator of the vehicle, however this operation is usually effected prior to the operation of shifting the gears of the transmission.

To establish the two speed axle 24 in its high gear setting the driver will, either before or after releasing the accelerator to reverse the engine torque and to provide a source of vacuum, again actuate the knob 17 thereby rotating the straps 76 and 78 in a clockwise direction, Figure 2; and this operation, as will be apparent from an inspection of Figures 2 and 5 and from the above description of the operation of the lever 60, will result in an upward movement of the pin 58 and a compression of the spring 102. In this operation one end of the lever 60 contacts a C-shaped stop 108, Figure 5, secured to the top of the pin 58, and the valve 54 will, by this operation, contact a seat 106 thereby cutting off the communication between the compartment 32 and the atmosphere and connecting said compartment with the source of vacuum; and this operation will also result in a seating of the valve 52 upon a seat 110 to vent the compartment 29 of the motor 20 to the atmosphere. The motor 20 is, by this operation of the valve 18, energized to establish the transmission in its high gear setting.

There is thus provided a very simple, compact and effective double three way valve mechanism adapted to control a double acting fluid pressure motor such for example as the motor employed to actuate a two speed axle mechanism of an automotive vehicle. The trigger like over center operation of the springs 70 and 72 serve to quickly and positively operate the valve members 52 and 54 to effect an operation of the motor 20. It is also to be noted that the mechanism for effecting the rotation of the valve operating lever 60, that is the straps 76 and 78, pin 74, cable 82, and springs 70 and 72, may also be employed to actuate a lever of any mechanism where a quick and positive operation of said lever is required.

The above and other objects and features of the invention will appear more fully hereinafter from a consideration of the following description taken in connection with the accompanying drawings where one embodiment of the invention is illustrated by way of example.

I claim:

A valve mechanism including a casing shaped to provide two control compartments, a vacuum compartment, and an air vent compartment; a valve member within the casing movable to one position to interconnect the vacuum compartment with one of the control compartments and to another position to interconnect the latter compartment with the air vent compartment; another valve member with the casing movable to one position to interconnect the vacuum compartment with the other of said control compartments and to another position to interconnect the latter compartment with the air vent compartment; and means for simultaneously actuating said valve members to connect one of said compartments to the vacuum compartment and at the same time vent the other of said compartments to the atmosphere, said means including a longitudinally disposed lever pivotally mounted on a wall in one of said casing compartments, lost motion connection means at each end of the lever for operating its connected valve, an actuator member for the lever located adjacent to and spaced from one end of said lever and adapted to move across the pivotal axis thereof, guide connection links pivotally connecting the lever pivot and the actuator, and preloaded spring means connecting the distal end of said lever and the actuator, whereby movement of the actuator causes the spring to move across the lever pivot and rotate the lever to effect a snap action of said lever to alternately actuate the respective valves loosely connected thereto.

References Cited in the file of this patent

UNITED STATES PATENTS

| | | |
|---|---|---|
| 2,243,937 | Almond | June 3, 1941 |
| 2,366,127 | Rappl | Dec. 26, 1944 |
| 2,553,940 | Quartullo | May 22, 1951 |